United States Patent [19]
Cherdron et al.

[11] 3,797,758
[45] Mar. 19, 1974

[54] METHOD OF PRODUCING FINELY DISPERSED ALPHA CALCIUM SULFATE HEMIHYDRATE

[75] Inventors: Egon Cherdron, Limburgerhof/Pfalz; Manfred Haerter, Neuhofen/Pfalz; Fritz Fässle, Limburgerhof/Pfalz; Hans-Joachim Förster, Schwetzingen-Hirschacker; Istvan Potencsik, Mannheim, all of Germany

[73] Assignee: Gebr. Giulini Gesellschaft mit beschrankter Haftung, Ludwigshafen a. Rhine, Germany

[22] Filed: June 16, 1972

[21] Appl. No.: 263,473

[52] U.S. Cl. .................................. 241/29, 423/172
[51] Int. Cl. ............................................ B02c 19/00
[58] Field of Search .......... 241/26, 29, 30; 423/170, 423/171, 172

[56] References Cited
UNITED STATES PATENTS

| | | | |
|---|---|---|---|
| 2,214,815 | 9/1940 | Hanahan | 241/29 |
| 2,383,254 | 8/1945 | Jessen | 423/172 |
| 2,913,308 | 11/1959 | Dailey et al. | 423/172 |

Primary Examiner—Granville Y. Custer, Jr.
Attorney, Agent, or Firm—Spencer & Kaye

[57] ABSTRACT

A method for producing finely dispersed alpha calcium sulfate hemihydrate. The hemihydrate has a solvent retention of at least 0.85 milliliters toluene per gram. The method includes grinding alpha calcium sulfate hemihydrate to an average particle size below 4 microns and subjecting the resulting product to a disintegrating of agglomerations of particles in the product.

3 Claims, No Drawings

METHOD OF PRODUCING FINELY DISPERSED ALPHA CALCIUM SULFATE HEMIHYDRATE

BACKGROUND OF THE INVENTION

The present invention relates to the producing of finely dispersed alpha calcium sulfate hemihydrate by grinding and subsequent disintegrating of agglomerates arising during the grinding.

The grinding of alpha calcium sulfate hemihydrate has been practiced. And, it has been recognized that grinding can influence the surface and setting behavior of alpha calcium sulfate hemihydrate.

U.S. Pat. No. 3,437,330 issued Apr. 8, 1968, to H.K. Worner for the "Continuous Production of Alpha Plaster" proposes grinding alpha calcium sulfate hemihydrate.

In U.S. Pat. No. 2,913,308 issued Nov. 17, 1959, to Manvel C. Dailey et al. for a "Process for the Production of High Strength Low Consistency Calcined Gypsum," a strong alpha calcium sulfate hemihydrate ground to a Blaine factor (defined in this U.S. Pat. No. 2,913,308) of 1,700 to 3,500 cm$^2$/g is disclosed. This product has a consistency (defined in this U.S. Pat. No. 2,913,308) of 27 to 36 and gives test specimen compressive strengths of over 700 kiloponds/cm$^2$.

U.S. Pat. No. 1,901,051 issued Mar. 14, 1933, to W.S. Randel et al. for a "High Strength Calcined Gypsum and Process of Manufacturing Same" indicates that with even more grinding to a surface of over 4,000 cm$^2$/g one obtains comprssive strengths of only 458 kiloponds/cm$^2$ at a consistency of 40 to 42.

In Ullmann's ENZYKLOPAEDIE DER TECHNISCHEN CHEMIE (in translation, ENCYCLOPEDIA OF TECHNICAL CHEMISTRY), Volume 8, Third Edition (1957), at page 116, it is indicated that the type and duration of grinding influences the quanity of the hemihydrate. Thus, for example, the consistency of an alpha hemihydrate passes through a minimum as the duration of grinding in a ball mill increases. And, with increasing Blaine factor, the set compressive strength of the ground alpha calcium sulfate hemihydrate reaches a maximum and then for yet finer grinding decreases. According to this reference, one should not grind beyond a Blaine factor of 3,500 cm$^2$/g, if high-strength gypsum products are desired.

West German Offenlegungsschrift (Laid-Open Application) No. 1,616,146 teaches that for certain applications, for example the coating of textiles or paper with alpha calcium sulfate hemihydrate the hemihydrate must be ground to a yet greater fineness.

To this end, hemihydrate having an initial grain size of, at the most, 200 microns length and 50 microns breadth as well as an axial ratio of from 1:2 to 1:5 is ground in a vibrating mill or a pin-tooth mill to an average grain size below 7 microns and preferably below 5 microns.

It was found that such fine material was extraordinarily well suited for coating textiles and that, with setting, the fine material cooperated with the textile to provide very strong members, for example plaster casts for enabling the regrowth of broken bones. If grinding was not to the discovered fine size, undesired lumps would form when mixing with water. Lumps cause the layer of setting hemihydrate on textile to be inhomogeneous. Additionally, if there was not the extra fine grinding, a watery file was exuded on the surface during setting and a reduction of strength properties was noted.

A problem with this grinding to fine size is that it is difficult in the practice to do such grinding.

Moreover, it has been found that grinding in a vibrating mill to the required fineness brings about the forming of agglomerates and that these agglomerates prevent a perfect coating of textiles. Thus, it has been noted that when agglomerates are present, the strength of plaster casts of the type used for broken bones is adversely affected.

SUMMARY OF THE INVENTION

An object of the present invention, therefore, is to provide a new and improved method for producing finely dispersed alpha calcium sulfate hemihydrate of average particle size below 4 microns. This method should avoid the problems of the past, as above-described. It should additionally be applicable for starting material of any particle size.

These as well as other objects which will become apparent in the discussion that follows are achieved, according to the present invention, by a method of producing finely dispersed alpha calcium sulfate hemihydrate having a solvent retention of at least 0.85 milliliters toluene per gram, comprising the steps of grinding alpha calcium sulfate hemihydrate to an average particle size below 4 microns and subjecting the product of the step of grinding to a step for disintegrating agglomerations of particles in the product.

DESCRIPTION OF THE PREFERRED EMBODIMENTS

According to the present invention, alpha calcium sulfate hemihydrate is first ground in suitable equipment to the required particle size, and then the agglomerates formed during this grinding are destroyed in a disintegrator.

The hammer mills usually used for grinding alpha calcium sulfate hemihydrate cannot grind to the requisite sizes below 4 microns. As has been observed, these hammer mills only knock off the corners and edges of the alpha calcium sulfate hemihydrate crystals, so that the crystals remain essentially unchanged in size. The application of pin-tooth mills and transverse stream mills leads to an analogous effect. To get to an average particle size below 4 microns with these devices, it is necessary to operate with a very small output and multiple recirculating. In spite of such measures, only a knocking off of the edges and corners of crystals is achieved.

A good crushing of coarse alpha calcium sulfate hemihydrate is obtained with ball mills or vibrating mills loaded with balls. However, in the case of both of these types of mills, grinding to below 4 microns causes a considerable agglomerate formation. According to the invention, these mill types are nevertheless preferred for grinding alpha hemihydrate of any initial particle size. After grinding in these mills, disintetration of the resulting agglomerates is carried out in a transverse stream mill, pin-tooth mill, or impact layer mill.

A so-treated, disintegrated alpha calcium sulfate hemihydrate is of extremely fine dispersion, shows no lump formation when being mixed into the solvent and water, and exudes no water during setting.

Surprising is moreover the fact that broken-bone-supporting plaster casts made from such material show a still further increase in the achievable strength.

The basic idea of the present invention rests on the technique of first grinding to the required particle size and then disintegrating the resulting agglomerates in a disintegrator.

That alpha calcium sulfate hemihydrate has not previously, or to only a small degree, been used with success in the field of textile and paper coating is a result of a failure to recognize the importance of a very fine dispersion. Either the material was not ground fine enough, or, if it had been ground to a fine size, it was not sufficiently dispersed.

It has been found that for application in the areas of textile or paper coating, for instance for making plaster casts for broken bones, there is needed, along with a low average particle size (determined according to Konzeny-Carmen on the Fisher-Sub-Sieve-Sizer, "Analytical Chemistry," Vol. 26, No. 10, 1954, pages 1623 to 1630) of below 4 microns, a high specific solvent wettability (determined according to Enslin, "Kolloid-Zeitschrift (in translation, Colloid Journal)," Vol. 82, No. 3, 1938, pages 254 et seq.). The solvent retention should be at least 0.85 milliliters per gram of material. Toluene is the solvent which has been used in the present instance.

Further illustrative of the present invention are Table I and Example I.

TABLE I. Particle Parameters as a Function of Treatment

| Type of Treatment | Average Particle Size in microns | Blaine factor cm²/g | Enslin factor ml toluene/g |
|---|---|---|---|
| Starting material (no grinding) | 50 | 436 | 0.40 |
| Transverse stream mill grinding | 6 | 3700 | 0.55 |
| Vibrating mill grinding | 2.8 | 7900 | 0.65 |
| Vibrating Mill and disintegration in a transverse stream mill | 2.8 | 7900 | 1.05 |

Table I shows that a single grinding, for example on a transverse stream mill, does not give the desired fine particle size or fine dispersion. Even multiple passage and small output in the same type of equipment does no more than to increase slightly the degree of fine grinding and do likewise for the dispersion.

In contrast, with a vibrating mill the desired fine particle is obtained with a single passage through the mill, but because of the simultaneously resulting agglomerate formation the desired fine dispersion in a solvent is not obtained. A fine dispersion is only obtained after a breaking up of the agglomerates on a disintegrator, especially a transverse stream mill.

Jet mills, with which one might obtain the requisite fine dispersion, cannot be used, because their operating media, steam or air, tend to produce undesired reactions with the highly active surface of the finely dispersed material.

The average particle size of the calcium sulfate hemihydrate should lie below 4 microns and not less than 0.5 microns. Preferably, it lies between 2 and 3 microns.

It has been found that when the finely dispersed alpha calcium sulfate hemihydrate made according to the process of the present invention is applied for the production of medicinal gypsum bandages, the bandages in the form of plaster casts on patients do obtain the expected increased strength. Consequently, plaster casts, used for example for supporting a broken bone, can be substantially lighter for given strength when made of material produced according to the present invention. The resulting smaller plaster cast wall thickness and the particular properties of the alpha calcium sulfate hemihydrate mean that no extreme temperature peaks occur during the setting of a cast on a patient. This means less skin irritation for the patient and consequently a considerable relief.

Example I

Alpha calcium sulfate hemihydrate having an average particle size of 50 microns was introduced into a double-tube ball vibrating mill continuously at the rate of 50 kilograms per hour. The internal tube diameter amounted to 200 millimeters in both tubes; their lengths lay at 1,200 millimeters. The two tubes were filled to about 70 percent of their volumes with steel balls (ball diameter in the upper tube = 15 to 25 millimeters, ball diameter in the lower tube = 10 to 20 millimeters. The mill was run at a rotational speed of 1,000 revolutions per minute and an oscillation circle diameter of 10 to 12 millimeters. The ground product showed an average particle size of 2.8 microns and an Enslin factor of 0.65 milliliters of toluene per gram. Then, the ground product was charged into a transverse stream, classifying mill having an hourly output of 200 kilograms. The internal diameter of the grinding chamber of the transverse stream mill amounted to 315 millimeters, while the diameter of the beater works was 280 millimeters. The transverse stream mill was run with a rotational speed of 7,100 revolutions per minute. The disintegrated material has an average particle size of 2.8 microns and an Enslin factor of 1.05 milliliters of toluene per gram. A plaster cast made from bandage material using the hemihydrate product of this Example I had a diameter of 70 millimeters, a length of 50 millimeters, and an average wall thickness of 10 millimeters. This cast had, one hour after its making and while still wet, a breaking strength of 50 kiloponds. In a dry condition, its breaking strength was 112 kiloponds. The corresponding figures of product which was used for making a bandage after grinding in the vibrating mill, but without undergoing a disintegrating step, were 28 kiloponds and 81 kiloponds.

Example II

Alpha calcium sulfate hemihydrate having an average particle size of 50 microns was introduced into an ALPINE Super-Orion-Kugelmuehle, a ball mill of Alphine AG, Augsburg, continuously at the rate of 700 kilograms per hour. The ground product showed an average particle size of 2.4 microns and an Enslin factor of 0.70 milliliters of toluene per gram. Then, the ground product was charged into a transverse stream, classifying mill having an hourly output of 700 kilograms. The trademark name of the transverse stream mill is ULTRA-ROTOR and the manufacturer Altenburger Maschinen KG, Hamm, West Germany. The disintegrated material had an average particle size of 2.4 microns and an Enslin factor of 1.08 milliliters of toluene per gram. A plaster cast made from bandage material using the hemihydrate product of this Example II had a diameter of 70 millimeters, a length of 50 millimeters, and an average wall thickness of 10 millimeters. This case had, ohn hour after its making and while still wet, a breaking strength of 48 kiloponds. In a dry condition, its breaking strength was 107 kiloponds. The corresponding figures of product which was used for making a bandage after grinding in the ball mill, bat without undergoing a disintegrating step, were 30 kiloponds and 84 kiloponds. The bandages of examples I and II were made by mixing the disintegrated hemihydrate (average particle size 2.8 microns respectively 2.4 microns) with a volatile liquid, e.g., methanol or ethylendichlorid. The produced slurry which contained a bonding agent in the form of water insoluble ethyl cellulose (0.5 percent by weight of plaster) to adhere the plaster particles to themselves and to the backing was spreaded onto a fabric substrate, which consisted of a gauze, having 17 – 20 threads per square centimeter. The amount of hemihydrate per square meter was 400 – 500 grams.

The dried and porous bandages, coated with hemihydrate were then immersed in a beaker of distilled water at temperature of 20° C. After 5 seconds of immersion, the bandages were removed from the water and wrung out by hand until no further water can be expressed. Then the bandages were wound on cylindrical forms. The bandages were wound and stroked with the hand to give the rolls a smooth surface and to bind the convolutions together. After setting the casts were removed from the forms.

The plaster casts had a diameter of 70 millimeters, a length of 50 millimeters, and an average wall thickness of 10 millimeters. The breaking strenght of the plaster casts were measured with WOLPERT-Pruefmaschine Z 100/500 (rate 30 m/min.). The breaking strength measured in dry condition is the maximum load in kp, which is necessary to crush the cast. The breaking strength of the cast measured one hour after its making and while still wet, is read from the diagram (graph). As soon as the cast reacts on the load the curve shows a break. This break in the curve (graph) is considered as initial value of breaking strength.

As brought out above, it is preferred to do the grinding for the invention in ball mills or vibrating mills loaded with balls. A general description of suitable ball mills is contained in the indicated figures and pages of the following book: Ullmann's ENZYKLOPAEDIE DER TECHNISCHEN CHEMIE, Volume 1, Third Edition (1951), at pages 625 and 626, figure 932. The trademark name and model number, and manufacturer with address, for a preferred ball mill is: ALPINE Super-Orion-Kugelmuehle, Alpine AG, 89 Augsburg, West-Germany.

A general description of suitable vibrating mills loaded with balls is contained in the indicated figure and pages of the following book: Ullmann's ENZYKLOPAEOIE DER TECHNISCHEN CHEMIE, Volume 1, Third Edition (1951) at page 628, figure 937 and "Aufbereitungstechnik" a Journal published by Verlag fuer Aufbereitung Schirmer & Zeh, Wiesbaden, West-Germany (1965) pages 175–180. The trademark name model number, and manufacturer with address, for a preferred vibrating mill and the mill used in Example I is: Palla U, Kloeckner-Humboldt-Deutz AG, 5 Koeln, West Germany.

As brought out above, it is preferred to do the disintegrating for the invention in transverse stream mills, pin tooth mills, or impact layer mills. A general description of suitable transverse stream mills is contained in the indicated figures and pages of the following journal: Chemiker-Zeitung. Volume 94 (1970) page 885. The trademark name and model number, and manufacturer with address, for a preferred transverse stream mill and the mill used in Example I is: ULTRAPLEX-Querstrommuehle 315 UP, manufactured by ALPINE AG, 89 Augsburg, West Germany. A general description of suitable pin-tooth mills is contained in the indicated figure and page of the following book: Ullmann's ENZYKLOPAEDIE DER TECHNISCHEN CHEMIE, volume 1, Third Edition (1951) at page 631, figure 945. The trademark name and model number, and manufacturer with address, for a preferred pintooth mill is:ALPINE-Kolloplex-Muehle, manufactured by ALPINE AG, 89 Augsburg, West Germany.

A general description of suitable impact layer mills is contained in the indicated figure and pages of the following book: Ullmann's ENZYKLOPAEDIE DER TECHNISCHEN CHEMIE, Volume 1, Third Edition (1951), at pages 629 and 630, figure 940. The trademark name and model number, and manufacturer with address, for a preferred impact layer mill is: Prallmuehle HAZEMAG, Hazemag, 44 Munster/Westfalen, West-Germany.

It will be understood that the above description of the present invention is susceptible to various modifications, changes and adaptations, and the same are intended to be comprehended within the meaning and range of equivalents of the appended claims.

We claim

1. A method for producing finely dispersed alpha calcium sulfate hemihydrate having a solvent retention of at least 0.85 milliliters toluene per gram, comprising the steps of grinding alpha calcium sulfate hemihydrate to an average particle size below 4 microns and subjecting the product of the step grinding to a step for disintegrating agglomerations of particles in said product.

2. A method as claimed in claim 1, said grinding being in a ball vibrating mill.

3. A method as claimed in claim 2, said disintegrating being in a transverse stream mill.

* * * * *